United States Patent
Melnyk et al.

(10) Patent No.: US 8,255,551 B2
(45) Date of Patent: *Aug. 28, 2012

(54) ADAPTIVE BITRATE MANAGEMENT FOR STREAMING MEDIA OVER PACKET NETWORKS

(75) Inventors: Miguel A. Melnyk, Champaign, IL (US); Nicholas J. Stavrakos, Los Altos, CA (US); Andrew Penner, Champaign, IL (US); Jeremy Tidemann, Champaign, IL (US); Fabian Breg, Savoy, IL (US)

(73) Assignee: Bytemobile, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/194,761

(22) Filed: Jul. 29, 2011

(65) Prior Publication Data

US 2011/0283012 A1 Nov. 17, 2011

Related U.S. Application Data

(63) Continuation of application No. 12/416,085, filed on Mar. 31, 2009, now Pat. No. 7,991,904, which is a continuation-in-part of application No. 12/170,347, filed on Jul. 9, 2008, now Pat. No. 7,987,285.

(60) Provisional application No. 60/948,917, filed on Jul. 10, 2007.

(51) Int. Cl.
*G06F 15/16* (2006.01)

(52) U.S. Cl. ........ 709/230; 709/226; 709/227; 709/231; 370/206; 370/241; 705/14.4; 705/14.73

(58) Field of Classification Search .......... 709/230–231; 370/506

See application file for complete search history.

(56) References Cited

U.S. PATENT DOCUMENTS

| | | | |
|---|---|---|---|
| 7,627,684 B2 * | 12/2009 | Boucher et al. | 709/230 |
| 7,653,539 B2 | 1/2010 | Yamanashi et al. | |
| 7,720,983 B2 * | 5/2010 | Klemets et al. | 709/231 |
| 7,747,764 B2 * | 6/2010 | Batke et al. | 709/230 |
| 7,764,668 B2 | 7/2010 | Yoshizawa et al. | |
| 7,779,443 B2 | 8/2010 | Kim | |

(Continued)

FOREIGN PATENT DOCUMENTS

EP   1 202 487 A2   5/2002

(Continued)

OTHER PUBLICATIONS

Baldo, Nicola, et al., "RTCP Feedback Based Transmission Rate Control for 3G Wireless Multimedia Streaming," IEEE, 0-7803-8523-3/04 (2004), pp. 1817-1821.

(Continued)

*Primary Examiner* — Wing Chan
*Assistant Examiner* — Razu Miah
(74) *Attorney, Agent, or Firm* — Finnegan, Henderson, Farabow, Garrett & Dunner LLP

(57) ABSTRACT

A method including providing pseudo-streaming media data to a terminal; receiving a transport control protocol (TCP) acknowledgement from the terminal; estimating one or more network conditions of a network based at least in part on the TCP acknowledgement; determining an optimal session bitrate based on the estimated one or more network conditions; and providing pseudo-streaming media data to the terminal based on the optimal session bitrate.

19 Claims, 6 Drawing Sheets

U.S. PATENT DOCUMENTS

| | | | |
|---|---|---|---|
| 2002/0010938 A1 | 1/2002 | Zhang et al. | |
| 2002/0103554 A1 | 8/2002 | Coles et al. | |
| 2002/0154694 A1 | 10/2002 | Birch | |
| 2003/0018794 A1* | 1/2003 | Zhang et al. | 709/231 |
| 2003/0023738 A1* | 1/2003 | Boivie et al. | 709/230 |
| 2004/0107284 A1 | 6/2004 | Koperda et al. | |
| 2004/0170179 A1 | 9/2004 | Johansson et al. | |
| 2004/0223468 A1* | 11/2004 | Benco et al. | 370/329 |
| 2004/0267445 A1 | 12/2004 | De Luca et al. | |
| 2005/0005020 A1 | 1/2005 | Rey et al. | |
| 2005/0036698 A1 | 2/2005 | Beom | |
| 2005/0105471 A1 | 5/2005 | Ido et al. | |
| 2005/0175093 A1 | 8/2005 | Haskell et al. | |
| 2005/0180502 A1 | 8/2005 | Puri | |
| 2005/0207343 A1* | 9/2005 | Han, II | 370/235 |
| 2005/0210155 A1* | 9/2005 | Oeda et al. | 709/249 |
| 2005/0259947 A1 | 11/2005 | Wang et al. | |
| 2005/0262251 A1* | 11/2005 | Klemets et al. | 709/230 |
| 2005/0283809 A1 | 12/2005 | Kim | |
| 2006/0083260 A1* | 4/2006 | Wang et al. | 370/463 |
| 2006/0092867 A1 | 5/2006 | Muller et al. | |
| 2006/0095943 A1 | 5/2006 | Demircin et al. | |
| 2006/0099956 A1* | 5/2006 | Harada et al. | 455/452.2 |
| 2006/0143678 A1* | 6/2006 | Chou et al. | 725/118 |
| 2006/0156347 A1 | 7/2006 | Zhang et al. | |
| 2006/0165166 A1* | 7/2006 | Chou et al. | 375/240.05 |
| 2006/0179153 A1* | 8/2006 | Lee et al. | 709/231 |
| 2006/0182027 A1 | 8/2006 | Conte et al. | |
| 2006/0184688 A1 | 8/2006 | Ganguly et al. | |
| 2006/0200577 A1* | 9/2006 | Park | 709/231 |
| 2006/0203831 A1 | 9/2006 | Yoshizawa et al. | |
| 2007/0091920 A1 | 4/2007 | Harris et al. | |
| 2007/0208557 A1 | 9/2007 | Li et al. | |
| 2007/0230496 A1* | 10/2007 | Guo et al. | 370/432 |
| 2008/0120424 A1 | 5/2008 | Deshpande | |
| 2008/0177893 A1* | 7/2008 | Bowra et al. | 709/231 |
| 2008/0195743 A1 | 8/2008 | Brueck et al. | |
| 2008/0198929 A1 | 8/2008 | Fujihara | |
| 2009/0013366 A1 | 1/2009 | You et al. | |
| 2009/0019178 A1 | 1/2009 | Melnyk et al. | |
| 2009/0254657 A1 | 10/2009 | Melnyk et al. | |
| 2009/0327698 A1 | 12/2009 | Baker et al. | |
| 2010/0074535 A1 | 3/2010 | Bennett | |
| 2010/0205318 A1 | 8/2010 | Melnyk et al. | |

FOREIGN PATENT DOCUMENTS

| | | |
|---|---|---|
| EP | 1 294 193 A1 | 3/2003 |
| WO | WO 2005/022845 | 3/2005 |
| WO | WO 2005/022845 A2 | 3/2005 |
| WO | WO 2007/018841 A2 | 2/2007 |
| WO | WO 2007/018841 A3 | 2/2007 |

OTHER PUBLICATIONS

Basso, Andrea, et al., "Performance Evaluation of MPEG-4 Video over Realistic EDGE Wireless Networks," IEEE, 0-7803-7442-8/02 (2002), pp. 1118-1122.

Qu, Qi, et al., "Network-Aware Source-Adaptive Video Coding for Wireless Applications," 0-7803-8847-X/04 MILCOM (2004), Military Communications Conference, pp. 848-854.

Schulzrinne, H. et al., "RTP: A Transport Protocol for Real-Time Applications," Network Working Group, Jul. 2003, pp. 103.

International Search Report and Written Opinion mailed Oct. 10, 2008 for International Appl. No. PCT/US2008/008556.

International Search Report and Written Opinion mailed Apr. 7, 2010 for International Appl. No. PCT/US2010/000302.

Office Action mailed on Mar. 18, 2010 in related U.S. Appl. No. 12/170,347, filed Jul. 9, 2008.

Office Action mailed on Sep. 1, 2010 in related U.S. Appl. No. 12/170,347, filed Jul. 9, 2008.

Office Action mailed Sep. 24, 2010 in related U.S. Appl. No. 12/416,085, filed Mar. 31, 2009.

International Search Report and Written Opinion mailed Sep. 13, 2010 for Internatonal Appl. No. PCT/US2010/000959.

Notice of Alowance and Examiner Interview Summary mailed on Mar. 25, 2011 in related U.S. Appl. No. 12/170,347, filed Jul. 9, 2008.

Notice of Alowance and Examiner Interview Summary mailed on Mar. 29, 2011 in related U.S. Appl. No. 12/416,085, filed Mar. 31, 2009.

Office Action mailed May 12, 2011, in related U.S. Appl. No. 12/368,260, filed Feb. 9, 2009.

International Preliminary Report on Patentability and Written Opinion for PCT Application No. PCT/US2010/000959 issued Oct. 4, 2011.

Office Action mailed Oct. 25, 2011, in related U.S. Appl. No. 13/190,238, filed Jul. 25, 2011.

Office Action dated Aug. 4, 2011, in related European Application No. 08780143.7, filed Jan. 28, 2010.

Final Office Action dated Nov. 17, 2011, in related U.S. Appl. No. 12/368,260, filed Feb. 9, 2009.

Notification of Transmittal of the International Search Report and the Written Opinion for International Application No. PCT/US2010/000959, mailed Sep. 13, 2010, pp. 1-11.

* cited by examiner

ADAPTIVE BITRATE MANAGEMENT FOR STREAMING MEDIA OVER PACKET NETWORKS

CROSS REFERENCE TO RELATED PATENTS

This application is a continuation of U.S. application Ser. No. 12/416,085, "Adaptive Bitrate Management for Streaming Media Over packet Networks," filed Mar. 31, 2009 now U.S. Pat. No. 7,991,904, which is a continuation-in-part of U.S. application Ser. No. 12/170,347, "Adaptive Bitrate Management for Streaming Media over Packet Networks, filed Jul. 9, 2008 now U.S. Pat. No. 7,987,285, which claims the benefit of U.S. Provisional Application No. 60/948,917, "Adaptive Bitrate Management for Streaming Media over Packet Networks," filed Jul. 10, 2007, all of which are incorporated herein by reference.

BACKGROUND INFORMATION

Rate control is essential for media streaming over packet networks. The challenge in delivering bandwidth-intensive content like multimedia over capacity-limited, shared links is to quickly respond to changes in network conditions by adjusting the bitrate and the media encoding scheme to optimize the viewing and listening experience of the user. In particular, when transferring a media stream over a connection that cannot provide the necessary throughput, several undesirable effects arise. For example, a network buffer may overflow, resulting in packet loss causing garbled video or audio playback, or a media player buffer may underflow resulting in playback stall.

There are several different mechanisms to implement multimedia transport over packet networks. The first category of media network transports is streaming protocols, such as the Real Time Protocol (RTP). Streaming protocols are specifically designed to transport multimedia information with explicit timing information, and packets are generally expected to be sent at the time the media frame(s) in the payload are due.

Another category is pseudo-streaming. The most commonly used transport protocol for pseudo-streaming is Transmission Control Protocol (TCP), designed originally for bulk data transfers. As such, TCP does not explicitly indicate the timing information of the media in the payload. TCP is used to merely transfer a media clip (such as, e.g., .flv or .mp4 files). The media time information is implicitly sent within the media clip format, and the player simply plays back the clip as portions of it are downloaded. HTTP is commonly used as the download protocol over TCP In the case of streaming protocol transports, standard bodies have recommended protocols, or, extensions to protocols, to address the issue of transmission flow control and the implementation of bitrate management algorithms. Internet Engineering Task Force (IETF), in RFC 3550, specifies Real-time Transport Control Protocol (RTCP) as a companion to RTP and the fundamental building block to implement bit rate/packet rate control in RTP streaming media. Several extensions to RTCP, suited for high capacity networks, follow this original recommendation. Other proprietary protocols such as Real Time Messaging Protocol (RTMP) feature similar mechanisms.

Pseudo-streaming transport, on the other hand, usually do not require additional protocols for flow control. TCP itself uses its native endpoint feedback to perform flow control over its connections. TCP packets are identified by packet sequence numbers, which are acknowledged in the opposite direction via acknowledgement (ACK) packets. ACKs are unaware of the type and properties of the payload, thus making it difficult to implement a bitrate management algorithm for pseudo-streaming.

There are several challenges encountered while delivering a multimedia session over packet wireless networks. These challenges can include:

Sudden adjustment of nominal transmission rate: Due to interference, fading, etc, 3+G networks negotiate physical layer parameters on the fly. Nominal transmission bitrates can change by a factor of 10. In both pseudo-streaming and streaming sessions, the most immediate effect is playback stalling due to buffer depletion.

Packet loss: caused by either link transmission errors or by network congestion.

Reduction of effective bandwidth: The wireless link is a shared resource at Layer 2, with MAC (Media Access Control) mechanism and scheduling. This means that an increased load presented by other wireless terminals in the same sector can reduce the effective bandwidth or capacity that a terminal will see.

Limited capacity: Available capacity can typically be a fraction to that obtained in traditional wireline internet access technologies, where currently capacity is not an issue. Fixed internet media sessions in video portals can typically offer to the network loads between 250 and 800 kbps. Despite the fact that current 3G cellular networks can sustain throughputs of 500 kbps and above, the total bitrate budget for a cellphone wireless multimedia session is typically kept under 150 kbps to ensure scalability.

The issues described above could affect streaming and pseudo-streaming sessions, making adaptive bitrate management essential to achieve good user experience.

For wireless mobile phones with RTP or similar streaming protocols, the implementation of this adaptive bitrate management is challenging due to:

Infrequent and incomplete network state information. The typical wireless media player supports RTCP receiver report as defined in RFC 3550, and the report generation frequency is fixed. As a result, the network state information obtained at the sender end is limited and sporadic. In its Packet Streaming Service specification, 3GPP recommends several extensions to the basic IETF RTCP Receiver Report (i.e. RTCP Extended Reports, or XR). Unfortunately, very few handsets implement these enhancements;

Different media streams are handled separately. Despite the fact that they are both transmitted over the same network link, audio and video streams are handled separately by RTCP. Both RTCP reports provide state information about the same network, therefore a joint analysis; and Low media bitrates are typically used. The bitrate budget for a wireless multimedia session is generally very low (under 150 kbps). Any attempt to reduce the audio or video bitrates can have large perceptual impact on the session.

In the case of pseudo-streaming sessions, TCP handles lost packets by requesting retransmissions. Issues, such as quality degradation due to dropped media packets, are therefore non-existent even though the actual occurrence of packet loss in the system layer leads to increased latency in the data stream, increasing the probability of media players stalling due to empty buffers. The following notable problems occur:

The feedback provided by TCP's ACK packets is completely unaware of the media time being transferred An HTTP download over TCP will send as much of the media file as possible and as quickly as possible.

Additional components can be required at the receiver to cope with the fact that the internal state of TCP is not directly available to media applications.

DETAILED DESCRIPTION OF DRAWINGS

Reference will now be made in detail to the exemplary embodiments consistent with the invention, the examples of which are illustrated in the accompanying drawings. Wherever possible, the same reference numbers will be used throughout the drawings to refer to the same or like parts.

Adjusting the bitrate of streaming media sessions according to instantaneous network capacity can be a critical function required to deliver streaming media over wireless packet networks. Adaptive bitrate management is a comprehensive framework and method that enables the delivery of self-adjusting streaming or pseudo-streaming sessions to media players, for example, such as standard 3GPP-compliant media players, or Flash plugin used for web-embedded video. Adaptive bitrate management includes, among other things, an adaptive bitrate controller and a variable bitrate encoder, both of which allow the adaptive bitrate management the ability to implement joint session bitrate management for audio, video, and/or other streams simultaneously. In the case of a pseudo-streaming session, the adaptive bitrate controller can also include a media muxer to assemble a media clip by multiplexing audio and video frames generated by a variable bitrate encoder along with the necessary timestamps to indicate an instant of playback.

Adaptive bitrate management can be applied to all media transports (or protocol suites) that can be used for media transfer and provide transmission progress report mechanisms. The transmission progress report can apply to a multimedia session as a whole, or individual multimedia streams (audio, video, text, etc). The adaptive bitrate manager can include the ability to provide, to the sender, a way to map media time information to the bytes received by the receiver, either explicitly as in the case of RTCP, or implicitly, as in the TCP case through ACK packets.

Figure 1:
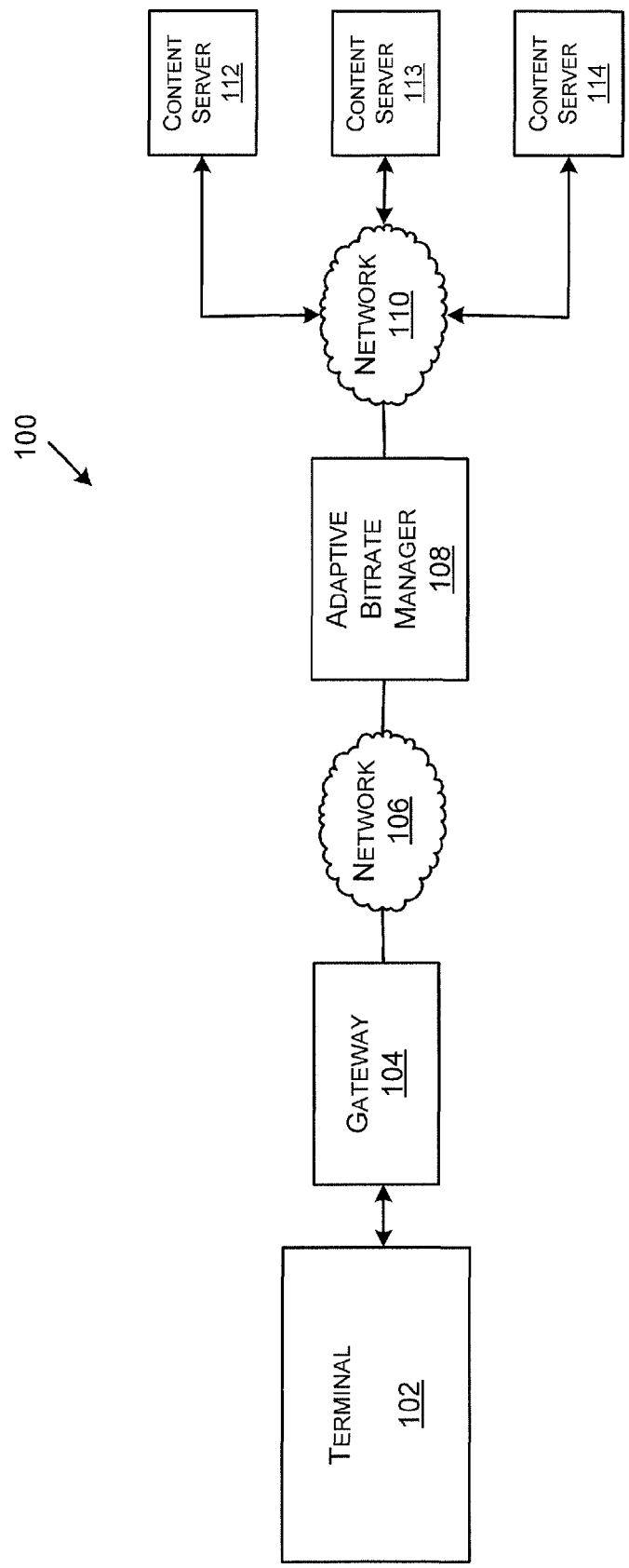
FIG. 1 is a block diagram of an exemplary system.

FIG. 1 is a block diagram of an exemplary system. Exemplary system 100 can be any type of system that transmits data packets over a network. For example, the exemplary system can include a mobile terminal accessing streaming media data from content servers through the Internet. The exemplary system can include, among other things, a terminal 102, a gateway 104, one or more networks 106, 110, an adaptive bitrate manager 108, and one or more content servers 112-114.

Terminal 102 is a hardware component including software applications that allow terminal 102 to communicate and receive packets corresponding to streaming media. Terminal 102 provides a display and one or more software applications, such as a media player, for displaying streaming media to a user of terminal 102. Further, terminal 102 has the capability of requesting and receiving data packets, such as data packets of streaming media, from the Internet. For example, terminal 102 can send request data to content servers 112-114 for a particular file or object data of a web page by its URL, and the content server of the web page can query the object data in a database and send the corresponding response data to terminal 102. In some embodiments, response data may be routed through adaptive bitrate manager 108.

While terminal 102 can be a wired terminal, some embodiments of the invention may prefer using a mobile terminal because mobile terminals are more likely to be in networks that would benefit more from an adaptive bitrate manager. The network connection tends to be less stable as compared to wired network connection due to, for example, the changing position of the mobile terminal where data rate transmissions between the mobile terminal and the network can fluctuate, in some cases quite dramatically.

Gateway 104 is a device that converts formatted data provided in one type of network to a particular format required for another type of network. Gateway 106, for example, may be a server, a router, a firewall server, a host, or a proxy server. Gateway 104 has the ability to transform the signals received from terminal 102 into a signal that network 106 can understand and vice versa. Gateway 104 may be capable of processing audio, video, and T.120 transmissions alone or in any combination, and is capable of full duplex media translations.

Networks 106 and 110 can include any combination of wide area networks (WANs), local area networks (LANs), or wireless networks suitable for packet-type communications, such as Internet communications. Further, networks 106 and 110 can include buffers for storing packets prior to transmitting them to their intended destination.

Adaptive bitrate manager 108 is a server that provides communications between gateway 104 and content servers 112-114. Adaptive bitrate manager 108 can optimize performance by adjusting a streaming media bitrate according to the connection, i.e., media network, between adaptive bitrate manager 108 and terminal 102. Adaptive bitrate manager 108 can include optimization techniques, further described below.

Content servers 112-114 are servers that receive the request data from terminal 102, process the request data accordingly, and return the response data back to terminal 102 through, in some embodiments, adaptive bitrate manager 108. For example, content servers 112-114 can be a web server, an enterprise server, or any other type of server. Content servers 112-114 can be a computer or a computer program responsible for accepting requests (e.g., HTTP, RTSP, or other protocols that can initiate a media session) from terminal 102 and serving terminal 102 with streaming media.

Figure 2:
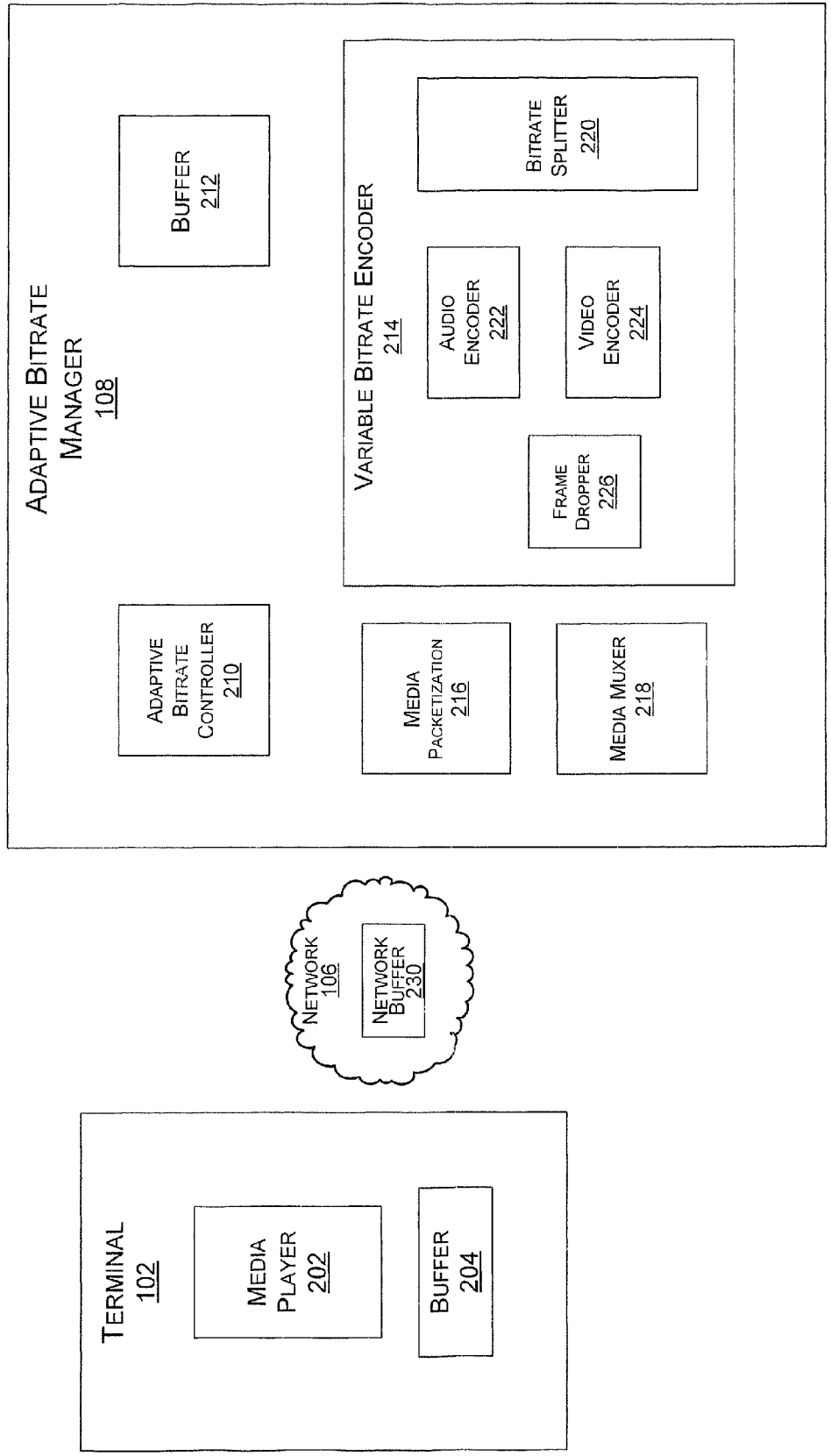
FIG. 2 is a block diagram illustrating an embodiment of the exemplary system of FIG. 1.

FIG. 2 is a block diagram illustrating an embodiment of the exemplary system of FIG. 1. Terminal 102 may include, among other things, a media player 202 and a buffer 204. Adaptive bitrate manager 108 can include, among other things, an adaptive bitrate controller 210, a buffer 212, a variable bitrate encoder 214, a media packetization 216, and a media muxer 218.

Media player 202 is computer software for playing multimedia files (such as streaming media) including video and/or audio media files. Such popular examples of media player 202 can include Microsoft Windows Media Player, Apple Quicktime Player, RealOne Player, and Adobe Flash Plugin for web-embedded video. In some embodiments, media player 202 decompresses the streaming video or audio using a codec and plays it back on a display of terminal 102. Media player 202 can be used as a stand alone application or embedded in a web page to create a video application interacting with HTML content. Further, media player 202 can provide feedback on media reception to the adaptive bitrate manager 108 in the form of media receiver reports. Media receiver reports can include RTCP packets for an RTP streaming session, or TCP ACKs for a pseudo-streaming session.

Buffer 204 (also known as terminal buffer 204) is a software program and/or a hardware device that temporarily stores multimedia packets before providing the multimedia packets to media player 202. In some embodiments, buffer 204 receives the multimedia packets from adaptive bitrate manager 108 via network 106. In some embodiments, buffer 204 receives the multimedia packets from a device other than adaptive bitrate manager 108. Once buffer 204 receives multimedia packets (or portions of a media clip if pseudo-streaming), it can provide the stored multimedia packets to media player 202. While FIG. 2 illustrates that terminal buffer 204 and media player 202 are separate components, one of ordinary skill the art will appreciate that terminal buffer 204 can be a part of media player 202. Further, while FIG. 2 illustrates only a single buffer, one of ordinary skill the art will appreciate that multiple buffers can exist, for example, one or more buffers for audio media packets and one or more buffers for video media packets.

Adaptive bitrate controller 210 of adaptive bitrate manager 108 is a software program and/or hardware device that periodically receives media receiver reports, e.g., such as RTCP receiver reports or TCP ACKs, from terminal 102 and provides an optimal session bitrate (or encoding parameters) to be used during the next period for encoding multimedia data to be sent to terminal 102. In some embodiments, adaptive bitrate controller 210 includes a buffer for storing the current and previous media receiver reports. To compute the optimal session bitrate or encoding parameters, adaptive bitrate controller 210 uses one or more network state estimators for estimating the state of the streaming media network and computing the optimal session bitrate to be used in the next reporting interval. For example, these network state estimators can estimate a media time in transit (MTT), a bitrate received at terminal 102, a round trip time estimate (RTTE), and a packet loss count. Adaptive bitrate controller 210 can use the history and statistics of the estimator to implement different control algorithms to compute the optimal session bitrate. Further, adaptive bitrate controller 210 may update the optimal session bitrate by determining the stability of the streaming media network. This can be done by checking the newly computed estimators for compliance to one or more stability criterion. Using the estimations and the stability criterion, adaptive bitrate controller 210 can determine whether to adjust the outgoing bitrate or keep the current outgoing bitrate unchanged for the next period. After this determination, adaptive bitrate controller 210 provides the optimal session bitrate value to variable bitrate encoder 214.

Buffer 212 of adaptive bitrate manager 108 is a software program and/or a hardware device that temporarily stores media data before providing the media data to variable bitrate encoder 214. In some embodiments, buffer 212 receives the media data from one or more content servers 112-114 via network 110. In some embodiments, buffer 212 receives the media data from a device other than content servers 112-114. In some pseudo-streaming embodiments, buffer 212 can include a de-muxer (such as de-muxer 350 illustrated in FIG. 3B) to separate audio and video tracks before relaying the media to variable bitrate encoder 214.

Variable bitrate encoder 214 of adaptive bitrate manager 108 is a software program and/or hardware device that receives optimal session bitrate data or encoding parameters from adaptive bitrate controller 210 and provides, to media packetization 216, audio and/or video data that are encoded at a bitrate matching the optimal session bitrate provided by adaptive bitrate controller 210. For a pseudo-streaming session, variable bitrate encoder 214 can provide the audio and video frames to media muxer 218 instead. Variable bitrate encoder can include, among other things, a bitrate splitter 220, an audio encoder 222, a video encoder 224, and, for some embodiments, a frame dropper 226.

Bitrate splitter 220 is a software program and/or a hardware device that receives the optimal session bitrate data from adaptive bitrate controller 210 and allocates optimal bitrates to be used when encoding the audio and video media data during the next interval. The allocation is such that the summation of bitrates for all tracks, when combined, can be substantially equal to the optimal session bitrate specified by adaptive bitrate controller 210. For example, this allocation could be based on a predetermined allocation, user preference, optimal performance data, privileging one type of data over the other, the amount of audio and video data to be provided, and/or any combination of the above. For example, bitrate splitter 220 may privilege audio quality in a way that if a reduced bitrate is specified, bitrate splitter 220 will reduce the video bitrate first and postpone reducing the audio bitrate as much as possible.

Audio encoder 222 and video encoder 224 are software programs and/or hardware devices that can receive their respective bitrate allocation from bitrate splitter 220 (or from the adaptive bitrate controller 210 directly) and provide outgoing media data encoded to match the bitrate of their respective bitrate allocation for the next reporting interval. Both audio encoder 222 and video encoder 224 can receive their respective media data from buffer 212 and output this media data according to its respective bitrate allocation from bitrate splitter 220. After the bitrate has been determined for both audio and video, it is the responsibility of each encoder to deliver maximum quality in the corresponding media track. For example, audio encoder 222 can generate variable bitrates by adjusting spectral quantization and cutoff frequency. Further, video encoder 224 can generate variable bitrates, for example, by adjusting Discrete Cosine Transform (DCT) coefficient quantization or by introducing frame dropping. This frame dropping can be executed, when needed, by frame dropper 226.

Frame dropper 226 is a software program and/or a hardware device that can be triggered when the desired bitrate is less than a quality threshold. This threshold can be codec dependent, and represents the bitrate value below which the use of coarser quantization leads to intolerable artifacts in the image. Frame dropper 226 can dynamically determine a frame dropping rate based on the desired video bitrate and the bitrate being generated by video encoder 224. To compensate inherent bitrate fluctuations in the video bitrate at the output of the encoder, frame dropper 226 can dynamically update the dropping rate by using a sliding window covering the byte size history of recently encoded frames.

Media packetization 216 is a software program and/or a hardware device that receives the audio and video media data from audio encoder 222 and video encoder 224 and translates this data into a packet format to deliver a streaming session. Media packetization 216 can either create separate packets for video and audio data, to be transferred over separate network channels, or combine audio and video in a single media stream. Besides carrying the audio and media data, media packets can include, among other things, a payload-type identifier for identifying the type of content, a packet sequence number, time stamping for allowing synchronization and jitter calculations, and delivery monitoring data. This type of data can later assist adaptive bitrate controller 210 in determining the quality of service provided by the network when adaptive bitrate controller 210 receives a corresponding media receiver report from terminal 102. Upon translating this data into a packet format, media packetization 216 transmits the data through network buffer 230 of network 106 to terminal buffer 204 of terminal 102. In addition adaptive bitrate manager 108 saves the history of sent media packets in the audio and video tracks. This history data can include, among other things, the time that each packet is sent, the sequence number, and the size of each media packet.

In some embodiments, such as where pseudo-streaming is involved, media muxer 218 can replace media packetization 216. Media muxer 218 is a software program and/or a hardware device that receives the individual audio and video media data from, either directly or indirectly, audio encoder 222 and video encoder 224 and combines this data into a media clip file format to deliver a pseudo-streaming session. Media muxer 218 sends subsequent fragments of the media file assembled on the fly to media player 202, using TCP as a transport protocol and in some embodiments, HTTP as the download protocol over TCP. Media muxer 218 can correspond to the muxer disclosed in U.S. application Ser. No. 12/368,260, titled "Method for Controlling Download Rate of Real-Time Streaming as Needed by Media Player," which is incorporated herein by reference, to add session timing functionality to increase the effectiveness of adaptive bitrate management in pseudo-streaming sessions. For pseudo-streaming sessions, adaptive bitrate manager 108 (e.g., as described below in FIG. 3B) can provide the pseudo-streaming media data at a rate according to the real time of the stream, as needed by the player.

Figure 3A:
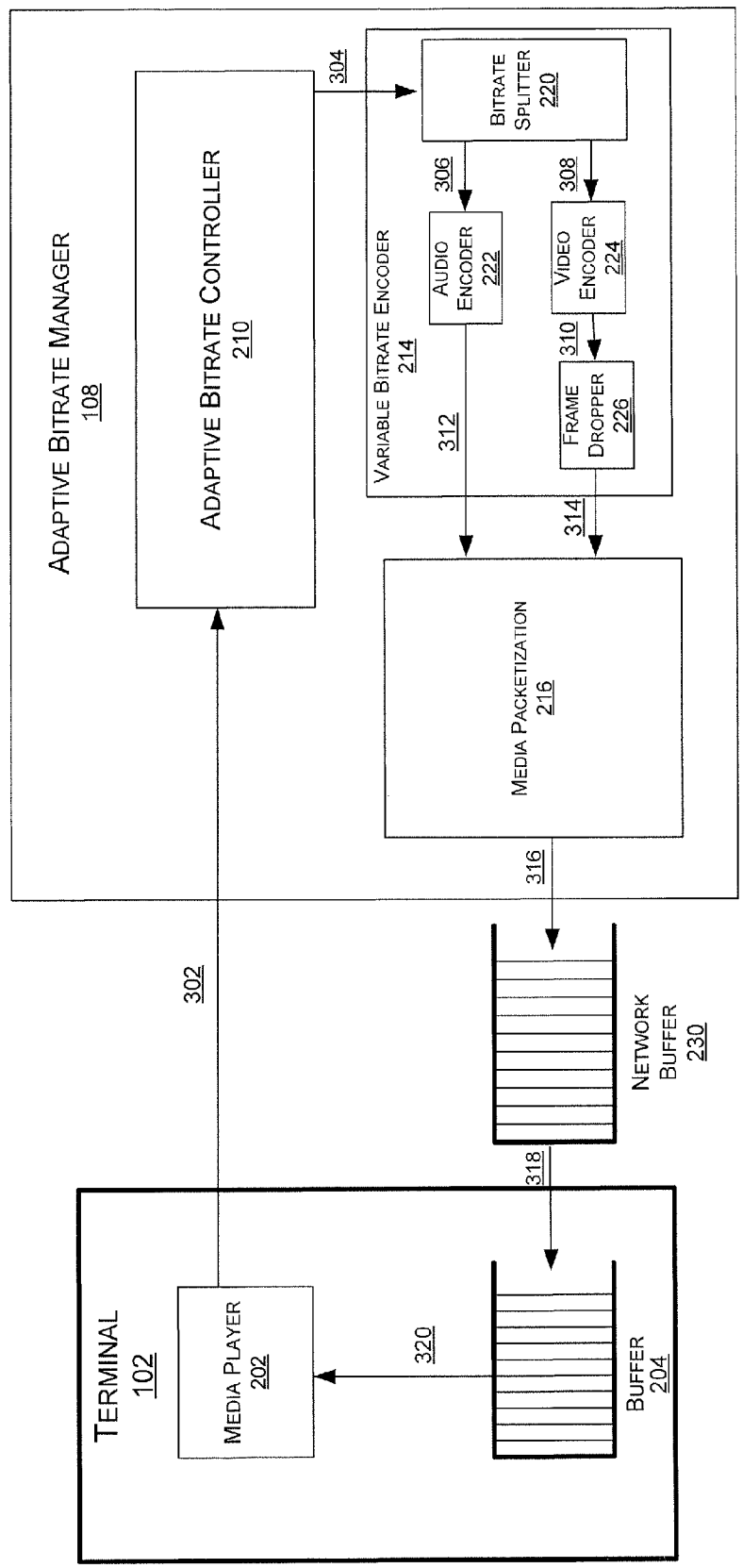
FIG. 3A is a functional diagram illustrating an exemplary communication flow in the exemplary system of FIG. 2.

FIG. 3A is a functional diagram illustrating an exemplary communication flow in the system of FIG. 2. It is assumed for purposes of explaining this exemplary embodiment that terminal 102 has already received at least some of the media data of the requested media data package. Further, it is assumed that the media data package includes both audio and video media data. After receiving packets, media player 202 transmits (302) a media receiver report to adaptive bitrate manager 108.

The media receiver report can be, for example, an RTCP receiver report or a TCP ACK in the case of pseudo-streaming. RTCP is a protocol for providing quality control information for an RTP flow, such as the transmission provided by media packetization 216 of adaptive bitrate manager 108. More specifically, RTCP can partner with media packetization 216 of adaptive bitrate manager 108 in the delivery and packaging of multimedia data. In some embodiments, media player 202 periodically transmits the RTCP receiver report. RTCP receiver report can provide feedback on the quality of service being provided by media packetization 216.

The most widely used method for streaming media on the Internet is HTTP based pseudo-streaming, carried by the Transmission Control Protocol (TCP). TCP implements its own generic (not media specific) packetization protocol. TCP internally uses ACKs to provide feedback on received TCP packets and therefore provides transport flow control. In the pseudo-streaming case, TCP ACK packets are used to update the key network estimators described previously. The most notable addition is to map TCP sequence numbers, as described in U.S. application Ser. No. 12/368,260 referred to above, to a stored index of media times and bytes to estimate Media Time In Transit.

While TCP and RTP/RTCP are used as exemplary embodiments to explain the adaptive bitrate control method, one of ordinary skill could appreciate that this adaptive bitrate control method is applicable to any protocol that fulfills the functions of media transport with sequencing and timing information and media transport feedback with information about received packets (covering sequencing, timing, loss rate, etc.).

Further, in some streaming embodiments, the media receiver report can be a single report having both audio and video report data (when audio and video are multiplexed into a single stream) or it can be separated into multiple reports (e.g., such as in the RTCP case where RTP carries audio and video in separate streams), for example, such as a receiver report for audio report data and a another receiver report for video report data. The media receiver report data can include, among other things, data regarding the sequence number of the most recently received media packet at terminal 102, the timestamp of the last packet received by terminal 102 reported in the media receiver report, the number of bits sent from this report, a round trip time, and a number of packets lost.

After receiving the receiver report, adaptive bitrate controller 210 can estimate the state of the network for determining whether to update the session bitrate for the next period. Adaptive bitrate controller 210 can save the newly received receiver report in a cumulative history and record the time at which the packet was received. To estimate the state of the network, adaptive bitrate controller 210 can combine data from the received media receiver report, the previously received receiver reports stored by the adaptive bitrate manager 108, and the history of sent media packets stored by adaptive bitrate manager 108. Adaptive bitrate controller can estimate, for both streaming and pseudo-streaming sessions, the following exemplary data by using network state estimators:

Media Time in Transit (MTT), computed as the difference between the timestamp of the most recently sent media packet and the timestamp of the last media packet received by the player reported in receiver report. For pseudo-streaming sessions, adaptive bitrate manager 108 conducts an additional step to calculate MTT. For example, adaptive bitrate manager 108 maintains a table of sequence numbers and timestamps in the media clip sent to the player. When ACKs are received, adaptive bitrate manager 108 can retrieve the timestamp corresponding to the byte sequence number in the ACK. Using this timestamp, adaptive bitrate manager can compute the MTT.

Bitrate received, computed as the bits received between the current and previously received receiver reports, divided by the time elapsed between these two receiver reports. The bits received between receiver reports are computed by cross referencing sequence numbers in the receiver report with the history of bytes sent stored at adaptive bitrate manager 108.

Round Trip Time Estimate (RTTE) can be obtained by averaging a number of the lower MTT values stored at the adaptive bitrate manager 108. For example, RTTE could be calculated by averaging the lowest 3 MTT values out of all stored MTT values for that streaming media network. Further, adaptive bitrate manager 108 can calculate the RTTE from data within an (RTCP) sender report. While these exemplary embodiments are illustrated, any method can be used to estimate a round trip time for the streaming media network.

Packet Loss count, captured directly from a media receiver report.

Adaptive bitrate controller 210 can use these estimates to implement several different control algorithms. For example, the Streaming Media stability criterion can be used to compute the session bitrate for the next interval.

Adaptive bitrate controller 210 uses the stability criterion to determine the stability of the streaming media network. While any number of algorithms can be used to determine the stability, one exemplary embodiment compares the estimated MTT with the RTTE. If the MTT and the RTTE remain close, adaptive bitrate controller 210 can determine that the streaming media network can properly support the current bitrate. Further, by comparing the bitrate received with the current bitrate session, adaptive bitrate controller 210 can determine that the network can cope with the load imposed by adaptive bitrate manager 108.

Adaptive bitrate controller 210 uses the estimations and the stability criterion to implement control algorithms for discovering the network capacity and adjusting the session bitrate accordingly. Adaptive bitrate controller 210 can define the variations of the control algorithms to operate in two different modes: (1) acquisition mode and (2) normal mode. While two modes have been illustrated in this exemplary embodiment, one of ordinary skill in the art will appreciate that multiple modes of operation can be defined.

In the normal mode, adaptive bitrate controller 210 operates in the steady state condition, indicating that the network is either maintaining or incrementally increasing the effective capacity seen by the system. In some embodiments, while operating in normal mode, the control algorithms can increase the session bitrate while the MTT is not increasing and the bitrate received remains close to the current session bitrate.

Adaptive bitrate controller 210 generally triggers the acquisition mode when it detects high packet loss, a sudden increase in the MTT, and/or a value of the MTT higher than a threshold (MTT threshold), which can be a fixed value or can be obtained dynamically for an adaptive control mechanism. Once triggered, acquisition mode sets the optimal session bitrate to a value, such as the bitrate received or a fraction of the received bitrate. Because the bitrate received can be the best estimation of the actual bitrate that the network can support at that particular point in time, adaptive bitrate manager 108 should quickly return back to a stable condition. In some embodiments, the new session bitrate is simply set to be a fraction of the current session bitrate.

In this embodiment, while only terminal 102 is illustrated for communicating with adaptive bitrate manager 108, one of ordinary skill in the art will appreciate that multiple terminals can communicate with adaptive bitrate manager 108, where each of the terminals can be located in substantially different network environments. Such environments can vary significantly, as different underlying wireless technologies and fixed network topologies can be used. Therefore, for some embodiments, it may be desirable to discover characteristics of the network environment beforehand so that key parameters in the framework are adjusted automatically. For example, adaptive bitrate controller 210 could set the MTT threshold at the beginning of the multimedia session to a value correlated to the RTTE. In this way, the system can attempt to follow the general stability criterion provided by adaptive bitrate controller 210. As indicated above, this stability criterion could be based on, independent of the network environment (a prior unknown), the comparison between the MTT and the RTTE, which is largely advantageous given that the actual network infrastructure type can rarely be determined a priori. In some embodiments, the optimal session bitrate can be updated by determining the difference between the MTT and the RTTE and adjusting the session bitrate according to the difference. For example, the larger the difference, the greater adjustment from the current session bitrate to an optimal session bitrate. In some embodiments, the MTT used for this determination can be based on the one or more historical values of MTT.

Using the control algorithms to compute a session bitrate update as described above, adaptive bitrate controller 210 determines an optimal session bitrate for transmitting media data to terminal 102. Adaptive bitrate controller 210 provides (304) the optimal session bitrate data to bitrate splitter 220 of variable bitrate encoder 214. Upon receiving the optimal session bitrate data, bitrate splitter 220 allocates the optimal session bitrate between the audio and video streams. For example, this allocation could be based on a predetermined allocation, a user preference optimal performance data, privileging one type of data over the other, the amount of audio and video data to be provided, and/or any combination of the above. For example, bitrate splitter 220 may privilege audio quality in a way that if a reduced bitrate is specified, bitrate splitter 220 reduces the video bitrate first and postpones reducing the audio bitrate as much as possible.

After splitting the optimal session bitrate into an optimal audio bitrate and an optimal video bitrate, bitrate splitter provides (306) the optimal audio bitrate to audio encoder 222 and provides (308) the optimal video bitrate to video encoder 224. Upon receiving their respective bitrate, both audio encoder 222 and video encoder 224 receive their respective media data from buffer 212 and output their respective audio media data and video media data according to the respective bitrate allocation from bitrate splitter 220. After the bitrate has been determined for both audio and video, it is the responsibility of each encoder to deliver maximum quality in the corresponding media track by maintaining the requested bitrate until the next interval. For example, audio encoder 222 can generate variable bitrates by adjusting quantization and cutoff frequency. Further, video encoder 224 can generate variable bitrates, for example, by adjusting Discrete Cosine Transform (DCT) coefficient quantization or by introducing frame dropping. This frame dropping can be executed, when needed, by frame dropper 226. In some embodiments, the encoding parameters of the encoders are not modified until they receive optimal bitrate data from bitrate splitter 220, which would be provided in a subsequent interval, because the encoders 222, 224 are slave devices to bitrate splitter 220.

In some embodiments, where frame dropping is preferred, video encoder 224 can provide (310) the video media data to frame dropper 226 when the optimal session bitrate is less than a quality threshold. This threshold can be codec dependent, and represents the bitrate value below which the use of coarser quantization leads to intolerable artifacts in the image. When frame dropping is triggered, frame dropper 226 can dynamically determine a frame dropping rate based on the desired video bitrate and the bitrate being generated by video encoder 224. To compensate inherent bitrate fluctuations in the video bitrate at the output of video encoder 224, frame dropper 226 can dynamically update the dropping rate by using a sliding window covering the byte size history of recently encoded frames. Frame dropper 226 can drop the frames accordingly to deliver the optimal session bitrate. In addition, in some embodiments, video encoder 224 can utilize the network state estimator of adaptive bitrate controller 210 to encode video in a more resilient manner. In some embodiments, packet loss information can be used in conjunction with the MTT by video encoder 224 to determine if a Group of Picture (GOP) value should be reduced, increasing the number of frames per second sent in the video stream. In some embodiment, if frame dropping is not needed, video encoder 224 can simply provide the video media data to media packetization 216 or media muxer 218 (illustrated in FIG. 3B). Audio encoder 222 and, for this embodiment, frame dropper 226 provide (312, 314) the audio media data and the video media data, respectively, to media packetization 216 or media muxer 218 (illustrated in FIG. 3B).

Upon receiving the audio media data and the video media data, media packetization 216 translates this data into a packet format. RTP defines a standardized packet format for delivering audio and video over the Internet, while TCP performs the same function for generic data. Upon translating this data into a packet format, media packetization 216 transmits (316) the audio and video media packets to network buffer 230 of network 106. Similarly, in the pseudo-streaming case, upon receiving audio and video data from the variable bitrate encoder 214, media muxer 218 creates a new portion of the media clip file and sends it to the player using TCP and possibly HTTP, which will be further described below in FIG. 3B. While only one transmission is shown, one of ordinary skill in the art will appreciate that transmission 316 can include separate transmissions for one or more audio media packets and another for one or more video media packets. Furthermore, one of ordinary skill in the art will appreciate that network 106 can include multiple networks, each having their own one or more buffers. Besides carrying the audio and media data, these packets can include, among other things, a payload-type identifier, a packet sequence number, a timestamp, and delivery monitoring data. This type of data can later assist adaptive bitrate controller 210 in determining the quality of service provided by the network when adaptive bitrate controller 210 receives the media receiver report from terminal 102. Moreover, adaptive bitrate manager 108 can also store a history of sent media packets so that it can later adjust the bitrate accordingly.

Upon receiving the packets, network buffer 230 of network 106 can store the packets until it is the packets turn to be provided to terminal 102. While only buffer 230 is illustrated, one of ordinary skill in the art will appreciate that one or more separate buffers can exist for each of the audio media packets and the video media packets. When it is the packets turn, network buffer 230 transmits (318) the packets to terminal buffer 204.

Upon receiving the packets, terminal buffer 204 of terminal 102 can store the packets until it is the packets turn to be provided to media player 202. While only buffer 230 is illustrated, one of ordinary skill in the art will appreciate that one or more separate buffers can exist for each of the audio media packets and the video media packets. When it is the packets turn, buffer 204 provides (320) the packets to media player 202. In turn, media player 202 can extract the relevant data out of packets and provide this data to adaptive bitrate manager 108 in a subsequent receiver report.

Figure 3B:
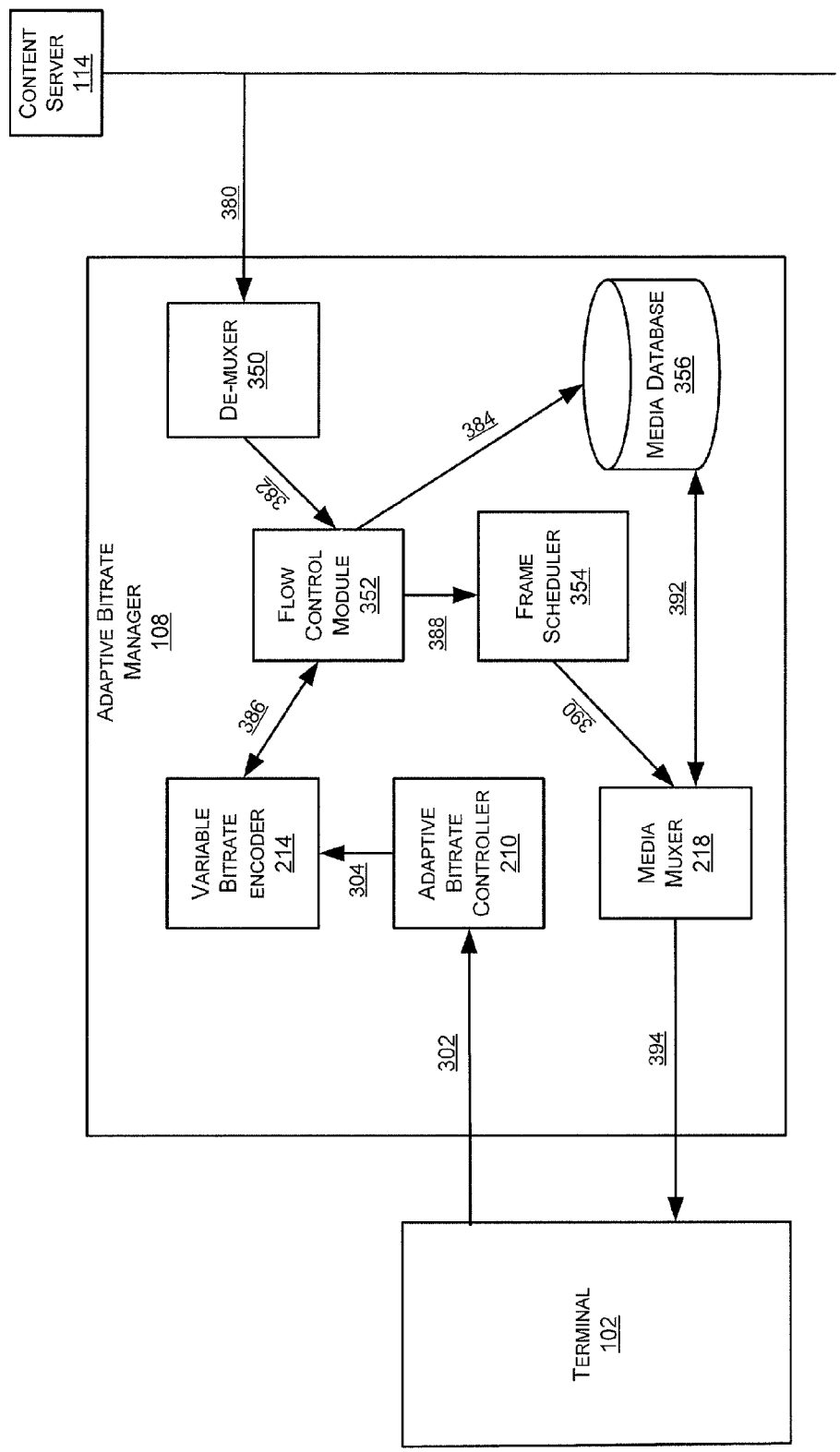
FIG. 3B is an exemplary functional diagram illustrating adaptive bitrate management according to a pseudo-streaming embodiment.

FIG. 3B is an exemplary functional diagram illustrating adaptive bitrate management according to the pseudo-streaming embodiment. This embodiment incorporates the methods and systems described in U.S. application Ser. No. 12/368,260 for providing adaptive bitrate management for pseudo-streaming communications. Further, de-muxer 350, flow control module 352, frame scheduler 354, and media database 356 as provided herein are similar to those described in U.S. application Ser. No. 12/368,260, which has been incorporated by reference. Furthermore, adaptive bitrate controller 210 and variable bitrate controller 214 operate similar to that described above in FIG. 3A and will not be described in detail here.

De-muxer 350 can be a software program and/or a hardware device that intercepts and parses the incoming media download and retrieves information of the media, such as clip timing information as explained below.

Flow control module 352 can be a software program and/or a hardware device that applies download rate patterns, and may frame the media data, and program the frame scheduler 354 accordingly.

Frame scheduler 354 can be a software program and/or a hardware device that triggers frame transmission according to timing specified by flow control module 352, variable bitrate encoder 214, and/or adaptive bitrate controller 210.

Media database 356 can be a structured collection of records or data of framed streaming media. The structure can be organized as a structured file, a relational database, an object-oriented database or other appropriate database. Computer software, such as a database management system, is utilized to manage and provide access to media database 356. Media database 356 can store and provide framed streaming media. It can be combined with other components of network element 110, such as frame scheduler 354, or media muxer 218. It can also be external to adaptive bitrate manager 108. Media database 356 provides buffering to store media data.

After receiving (380) streaming media data from content server 114, de-muxer 350 parses the streaming media and obtains information of the streaming media. For example, among other things, de-muxer 350 can retrieve timing information of the streaming media, which can be real-time playback rate on a media player at terminal 102. De-muxer 350 then transfers (382), to flow control module 352, the parsed streaming media and the information used for controlling download rate.

Based on the information of the streaming media, including the timing information, flow control module 352 applies download rate patterns and frames parsed streaming media. The framed streaming media can correspond to the real-time playback rate on the media player at terminal 102. Flow control module 352 then stores (384) the framed streaming media at media database 356 for transmission, and schedules (388) the frame scheduler 354 to trigger transmission of the frame steaming media according to the timing information and the download pattern.

Frame scheduler 354 triggers (390) media muxer 218 to transmit framed streaming media according to the timing schedule specified by flow control module 352. Upon the trigger (390), and after retrieving the stored media due to be sent (392), media muxer 218 provides (394) the framed streaming media, to terminal 102 according to the timing schedule. Providing step 394 may include providing the framed streaming media to one or more network buffers, as described above in FIG. 3A, which would then provide to terminal 102. Terminal 102 processes the streaming media similar to that described above in FIG. 3A. The delivery is flow-controlled download corresponding to the real-time playback rate on the media player at terminal 102.

After receiving portions of the streaming media, terminal 102 can provide (302) a media receiver report, as described above, to adaptive bitrate controller 210. Adaptive bitrate controller 210 can keep a table of sequence numbers and timestamps in the media clip sent to the player, which could be stored in media database 356. When TCP ACKs are received, adaptive bitrate controller 210 can retrieve the timestamp corresponding to the byte sequence number in the ACK, and then computes MTT, RITE, and other network estimators that can be used to implement the bitrate control algorithm and the stability criterion as described previously in FIG. 3A for the streaming media embodiment. After having detected changes in the network segment, such as degradation or an improvement of bandwidth in the network segment, adaptive bitrate controller 210 can instruct (304) variable bitrate encoder 214 to perform data optimization on streaming media in the media database 356 before sending to terminal 102. This can enable dynamic data optimization based on changes in the network segment where terminal 102 sits, to provide dynamically reduced-sized streaming media. Variable bitrate encoder 214 can interact (386) with flow control module 352 to combine download rate control with media data optimization. Through data optimization, such as media bitrate reduction techniques, variable bitrate encoder 214 can modify the size of each media frame in media database 356. Flow control module 352 can then frame the flow rate of the dynamically reduced-sized streaming media, based on the timing information of the streaming media.

Figure 4:
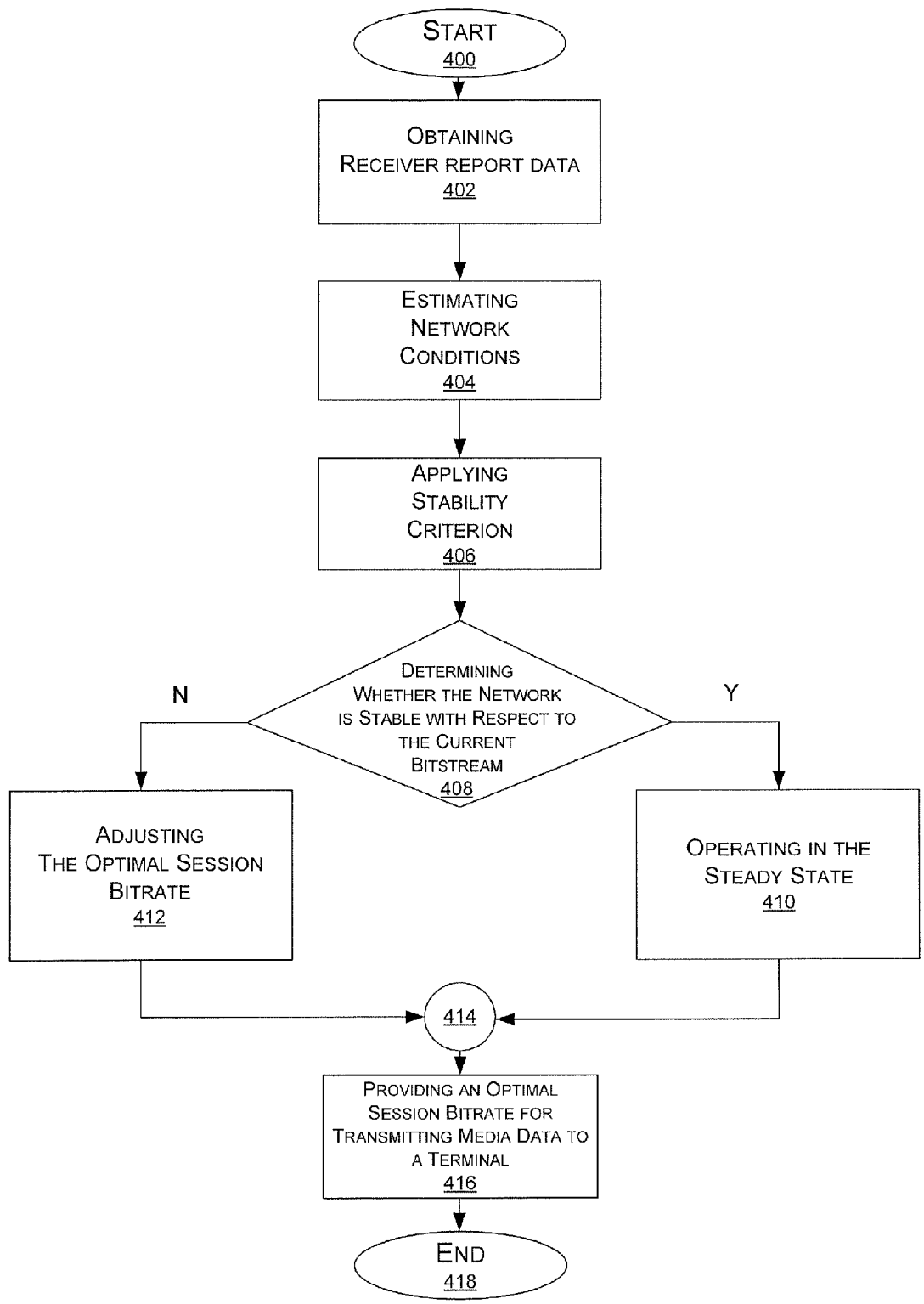
FIG. 4 is a flowchart representing an exemplary method for processing an RTCP packet or a TCP ACK.

FIG. 4 is a flowchart representing an exemplary method for processing a media receiver report. Referring to FIG. 4, it will be readily appreciated by one of ordinary skill in the art that the illustrated procedure can be altered to delete steps or further include additional steps. It is assumed for this exemplary method that a receiver report includes data concerning both audio and video media data. If a pseudo streaming session, the TCP ACK is processed to obtain information about the media transmission progress. While both types exists, one of ordinary skill in the art will appreciate that receiver report data can include either audio or video data. After initial start step 400, an adaptive bitrate manager obtains (402) receiver report data, which can include one or more receiver reports. This receiver report data can correlate to the quality and quantity of audio and video media packets received at a media player of a terminal, sent either directly by a media packetization of within a media clip created by a media muxer. The receiver report data can include, among other things, a sequence number of a last packet received by the terminal, a timestamp corresponding to such packet, a number of bits sent, a round trip time, and number of packets lost during a transmission from the adaptive bitrate manager to the terminal. The receiver report data can be obtained by receiving a media receiver report from the terminal and by cross-correlating the contents of the last received media receiver report with the history of media packets stored at the adaptive bitrate manager.

While RTP and RTCP are user level protocols, directly accessible to the multimedia applications, TCP is typically implemented in the kernel space, in a way that applications may not have visibility of its internal state. To overcome this, a simple kernel-level agent can be implemented to generate application-level receiver reports and send them to the adaptive bitrate manager upon the reception of ACK packets in the kernel space.

After receiving receiver report data, the adaptive bitrate manager estimates (404) network conditions of a streaming media network. To estimate the state of the network, the adaptive bitrate manager can combine data from the received receiver report data from step 402 and previously received receiver report data stored by the adaptive bitrate manager. The adaptive bitrate manager can estimate an MTT, a bitrate received, an RTTE, and a packet loss. In pseudo-streaming sessions, an extra step is required to calculate MTT. Adaptive bitrate manager can maintain a table of sequence numbers and timestamps in the media clip sent to a media player. When TCP ACKs are received, adaptive bitrate manager can retrieve the timestamp corresponding to the byte sequence number in the ACK, and then compute the MTT. The adaptive bitrate manager can use these estimates to implement several different control algorithms.

After estimating the network conditions, the adaptive bitrate manager applies (406) stability criterion to determine the stability of the streaming media network. If needed, the stability criterion can assist in adjusting the bitrate for attempting to stabilize the streaming media network, e.g., such as avoiding buffer overflows in the network and underflows at the terminal. While any number of algorithms can be used to determine the stability criterion, one exemplary embodiment compares the estimated MTT with the estimated RTTE, both of which are estimated in step 404. If the MTT and the RTTE remain close, the adaptive bitrate manager can use this comparison to determine that the streaming media network can properly support the current bitrate. Further, by comparing the bitrate received with the current bitrate session, the adaptive bitrate manager can determine that the streaming media network can cope with the load.

After establishing the stability criterion, the adaptive bitrate manager determines (408) whether the network is stable with respect to the current bitstream based on estimation step 404 and/or stability criterion establishment step 406. If the network is stable, the adaptive bitrate manager operates (410) in a steady state condition by either maintaining or incrementally increasing the current bitrate. In some embodiments, the optimal session bitrate can be computed by determining the difference between the MTT and the RTTE and adjusting the session bitrate according to the difference. For example, if the current session bitrate is less than a set target session bitrate, the adaptive bitrate manager can incrementally increase the optimal session bitrate if the values of the MTT and the RTTE are comparable. Then, the adaptive bitrate manager provides (416) an optimal session bitrate for transmitting media data to a terminal. After providing step 416, the method can proceed to end 418.

If determining that the network is not stable, the adaptive bitrate manager adjusts (412) the bitrate so that adaptive bitrate manager can reach a stable condition. For example, in some embodiments, the adaptive bitrate manager can use the estimated bitrate received from step 404 because, in some embodiments, the bitrate received can be the best estimation of the actual bitrate that the network can support at that particular point in time. Then, the adaptive bitrate manager provides (416) the optimal session bitrate for transmitting media data to the terminal. After providing step 416, the method can proceed to end 418.

Figure 5:
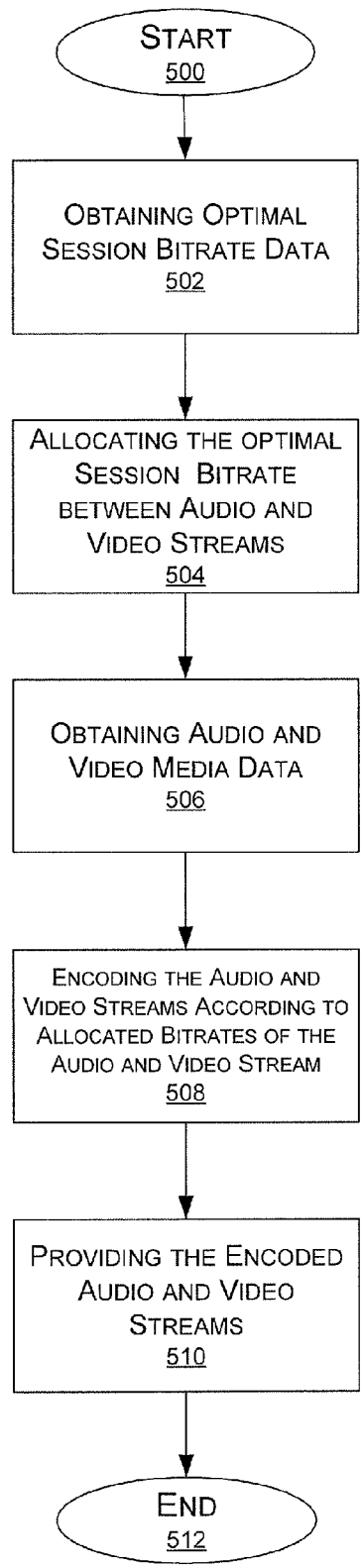
FIG. 5 is a flowchart representing an exemplary method for processing optimal session bitrate data.

FIG. 5 is a flowchart representing an exemplary method for processing optimal session bitrate data. Referring to FIG. 5, it will be readily appreciated by one of ordinary skill in the art that the illustrated procedure can be altered to delete steps or further include additional steps. It is assumed for this exemplary method that both audio and video media data exists. While both types exists, one of ordinary skill in the art will appreciate that either audio or video data can exist. After initial start step 500, an adaptive bitrate manager obtains (502) optimal session bitrate data for transmitting media data to a terminal.

Upon receiving the optimal session bitrate data, the adaptive bitrate manager allocates (504) the optimal session bitrate between audio and video streams to produce an optimal audio bitrate and an optimal video bitrate. For example, this allocation could be based on a predetermined allocation, user preference, optimal performance data, privileging one type of data over the other, the amount of audio and video data to be provided, and/or any combination of the above. For example, the adaptive bitrate manager may privilege audio quality in a way that if a reduced bitrate is specified, the adaptive bitrate manager can reduce the video bitrate first and postpone reducing the audio bitrate as much as possible.

Adaptive bitrate manager obtains (506) audio and video media data. In some embodiments, obtaining step 506 can occur prior to allocating step 504 or obtaining step 502. After allocating step 504 and obtaining step 506, the adaptive bitrate manager encodes (508) the audio and video media data according to their respective allocated bitrate specified at step 504.

After encoding the audio and video streams according to the allocated bitrate, the adaptive bitrate manager provides (510) the encoded audio and video media data for transmitting to the terminal. In some embodiments, a media packetization receives the encoded audio and video media data and translates this data into a packet format. In other embodiments, this data is received by a media muxer to create a media clip file to be sent over TCP to the player. RTP defines a standardized packet format for delivering audio and video over the Internet, while TCP provides its own packetization protocol for generic data, that can also be used for media streams. Upon translating this data into a packet format, the media packetization can then transmit the audio and video media packets to the terminal. After providing the encoded audio and video media data, the method can proceed to end 512.

The methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

In the preceding specification, the invention has been described with reference to specific exemplary embodiments. It will however, be evident that various modifications and changes may be made without departing from the broader spirit and scope of the invention as set forth in the claims that follow. The specification and drawings are accordingly to be regarded as illustrative rather than restrictive. Other embodiments of the invention may be apparent to those skilled in the art from consideration of the specification and practice of the invention disclosed herein.

What is claimed is:

1. A method comprising:
    providing pseudo-streaming media data to a terminal, wherein the provided pseudo streaming media data includes a sequence number and corresponds to a timestamp;
    causing a table to store an association between the sequence number and the timestamp;
    receiving a transport control protocol (TCP) acknowledgement from the terminal, wherein the received TCP acknowledgement includes the sequence number and corresponds to a certain time;
    acquiring the timestamp from the table using the sequence number of the TCP acknowledgement;
    estimating one or more network conditions of a network using a comparison between the certain time and the acquired timestamp;
    establishing stability criterion based on the estimated one or more network conditions;
    determining the stability of the network;
    determining an optimal session bitrate based on the estimated one or more network conditions;
    providing the optimal session bitrate based on the stability determination; and
    providing pseudo-streaming media data to the terminal according to the optimal session bitrate.

2. The method of claim 1, wherein establishing stability criterion further comprises comparing the media time in transit and a round trip time estimate for assisting with the stability determination.

3. The method of claim 1, wherein establishing stability criterion further comprises comparing a bitrate received with a current bitrate session.

4. The method of claim 1, further comprising maintaining or incrementally increasing a current bitrate when the stability of the network is considered normal.

5. The method of claim 1, further comprising adjusting a current bitrate when the stability of the network is not normal.

6. A method comprising:
    providing pseudo-streaming media data to a terminal, wherein the provided pseudo streaming media data includes a sequence number and corresponds to a timestamp;
    causing a table to store an association between the sequence number and the timestamp;
    receiving a transport control protocol (TCP) acknowledgement from the terminal, wherein the received TCP acknowledgement includes the sequence number and corresponds to a certain time;
    acquiring the timestamp from the table using the sequence number of the TCP acknowledgement;
    estimating one or more network conditions of a network using a comparison between the certain time and the acquired timestamp;
    determining an optimal session bitrate based on the estimated one or more network conditions;
    allocating the optimal session bitrate between audio media data and video media data to produce an optimal audio bitrate and an optimal video bitrate;
    encoding audio and video media data according to the optimal audio bitrate and the optimal video bitrate; and
    providing pseudo-streaming media data to the terminal according to the optimal session bitrate.

7. The method of claim 6, wherein providing media data to the terminal includes providing the encoded audio media data and the encoded video media data based on the optimal audio bitrate and the optimal video bitrate.

8. A method comprising:
    receiving a transport control protocol (TCP) acknowledgement from a terminal based on the terminal receiving pseudo-streaming media data, wherein the received TCP acknowledgement includes a sequence number and corresponds to a certain time;
    acquiring a timestamp from a table using the sequence number of the TCP acknowledgement wherein the table includes the sequence number and the associated timestamp for the pseudo-streaming media data provided to the terminal;
    estimating one or more network conditions of a network using a comparison between the certain time and the acquired timestamp;

determining the stability of the network based on the estimations, wherein determining the stability of the network is based on establishing stability criterion, and establishing stability criterion further comprises comparing the media time in transit and a round trip time estimate for assisting with the stability determination;
controlling a bitrate based on the determination; and
providing the bitrate to an encoder for transmitting pseudo-streaming media data according to the provided bitrate.

9. The method of claim 8, wherein establishing stability criterion further comprises comparing a bitrate received with a current bitrate session.

10. The method of claim 8, wherein controlling the bitrate includes maintaining or incrementally increasing a current bitrate when the stability of the network is considered normal.

11. The method of claim 8, wherein controlling the bitrate includes adjusting a current bitrate when the stability of the network is considered not normal.

12. A method comprising:
receiving an optimal session bitrate based on information provided by a transport control protocol (TCP) acknowledgement;
allocating the optimal session bitrate between audio and video media to produce an optimal audio bitrate and an optimal video bitrate, wherein allocating the optimal session bitrate between audio and video media involves allocating a higher bitrate for either the audio media or the video media over the other;
encoding audio and video media data according to the optimal audio bitrate and the optimal video bitrate;
multiplexing the encoded audio and video media data; and
providing the multiplexed audio and video data for transmittal to a terminal.

13. The method of claim 12, further comprising dropping frames of the encoded video data.

14. A system comprising:
a terminal, having a media player, configured to receive pseudo-streaming media data and provide a transport control protocol (TCP) acknowledgement based on the received pseudo-streaming media data, wherein the TCP acknowledgement includes a sequence number and corresponds to a certain time; and
an adaptive bitrate manager configured to:
receive the TCP acknowledgement,
acquire a timestamp from a table using the sequence number of the TCP acknowledgement, wherein the table includes the sequence number and the associated timestamp for the pseudo-streaming media data provided to the terminal,
estimate one or more network conditions using a comparison between the certain time and the acquired timestamp,
determine an optimal session bitrate based on the estimated one or more network conditions, and
provide pseudo-streaming media data to the terminal based on the optimal session bitrate;
wherein the adaptive bitrate manager further comprises:
an adaptive bitrate controller for receiving the receiver report and calculating an optimal session bitrate, and
an encoder for obtaining the optimal session bitrate, allocating the optimal session bitrate between audio and video media to produce an optimal audio bitrate and an optimal video bitrate, encoding audio and video data according to the optimal audio bitrate and the optimal video bitrate, and providing the encoded audio and video data for transmittal to the terminal.

15. A non-transitory computer readable storage medium storing instructions that, when executed by a computer, cause the computer to perform a method for processing a transport control protocol (TCP) acknowledgement, the method comprising:
providing pseudo-streaming media data to a terminal, wherein the provided pseudo-streaming media data includes a sequence number and corresponds to a timestamp;
causing a table to store an association between the sequence number and the timestamp;
receiving the transport control protocol (TCP) acknowledgement from the terminal, wherein the received TCP acknowledgement includes the sequence number and corresponds to a certain time;
acquiring the timestamp from the table using the sequence number of the TCP acknowledgement;
estimating one or more network conditions of a network using a comparison between the certain time and the acquired timestamp;
determining an optimal session bitrate based on the estimated one or more network conditions;
allocating the optimal session bitrate between audio media data and video media data to produce an optimal audio bitrate and an optimal video bitrate;
encoding audio and video media data according to the optimal audio bitrate and the optimal video bitrate; and
providing pseudo-streaming media data to the terminal according to the optimal session bitrate.

16. A non-transitory computer readable storage medium storing instructions that, when executed by a computer, cause the computer to perform a method for processing a transport control protocol (TCP) acknowledgement, the method comprising:
receiving a transport control protocol (TCP) acknowledgement from a terminal based on the terminal receiving pseudo-streaming media data, wherein the received TCP acknowledgement includes a sequence number and corresponds to a certain time;
acquiring a timestamp from a table using the sequence number of the TCP acknowledgement, wherein the table includes the sequence number and the associated timestamp for the pseudo-streaming media data provided to the terminal;
estimating one or more network conditions of a network using a comparison between the certain time and the acquired timestamp;
determining the stability of the network based on the estimations, wherein determining the stability of the network is based on establishing stability criterion, and establishing stability criterion further comprises comparing the media time in transit and a round trip time estimate for assisting with the stability determination;
controlling a bitrate based on the determination; and
providing the bitrate to an encoder for transmitting pseudo-streaming media data according to the provided bitrate.

17. A non-transitory computer readable storage medium storing instructions that, when executed by a computer, cause the computer to perform a method for processing an optimal session bitrate, the method comprising:
receiving the optimal session bitrate based on information provided by a transport control protocol (TCP) acknowledgement;
allocating the optimal session bitrate between audio and video media to produce an optimal audio bitrate and an optimal video bitrate, wherein allocating the optimal session bitrate between audio and video media involves allocating a higher bitrate for either the audio media or the video media over the other;

encoding audio and video media data according to the optimal audio bitrate and the optimal video bitrate;

multiplexing the encoded audio and video media data; and providing the multiplexed audio and video data for transmittal to a terminal.

18. A terminal comprising:

a buffer that receives pseudo-streaming media data packets transmitted by an adaptive bitrate manager over a network; and a media player that receives the pseudo-streaming media data packets and provides a transport control protocol (TCP) acknowledgement to the adaptive bitrate manager, where the adaptive bitrate manager is configured to:

receive the transport control protocol (TCP) acknowledgement, wherein the received TCP acknowledgement includes a sequence number and corresponds to a certain time, acquire a timestamp from a table using the sequence number of the TCP acknowledgement, wherein the table includes the sequence number and the associated timestamp for the pseudo-streaming media data provided to the terminal, estimate one or more network conditions using a comparison between the certain time and the acquired timestamp, determine an optimal session bitrate based on the estimated one or more network conditions, and provide pseudo-streaming media data to the buffer according to the optimal session bitrate;

wherein the adaptive bitrate manager further comprises:

an adaptive bitrate controller for receiving the receiver report and calculating an optimal session bitrate, and an encoder for obtaining the optimal session bitrate, allocating the optimal session bitrate between audio and video media to produce an optimal audio bitrate and an optimal video bitrate, encoding audio and video data according to the optimal audio bitrate and the optimal video bitrate, and providing the encoded audio and video data for transmittal to the terminal.

19. A non-transitory computer readable storage medium storing instructions that, when executed by a computer, cause the computer to perform a method for processing a transport control protocol (TCP) acknowledgement, the method comprising:

providing pseudo-streaming media data to a terminal, wherein the provided pseudo-streaming media data includes a sequence number and corresponds to a timestamp;

causing a table to store an association between the sequence number and the timestamp;

receiving the transport control protocol (TCP) acknowledgement from the terminal, wherein the received TCP acknowledgement includes the sequence number and corresponds to a certain time;

acquiring the timestamp from the table using the sequence number of the TCP acknowledgement;

estimating one or more network conditions of a network using a comparison between the certain time and the acquired timestamp;

establishing stability criterion based on the estimated one or more network conditions;

determining the stability of the network;

determining an optimal session bitrate based on the estimated one or more network conditions;

providing the optimal session bitrate based on the stability determination; and providing pseudo-streaming media data to the terminal according to the optimal session bitrate.

* * * * *